Figure 1:
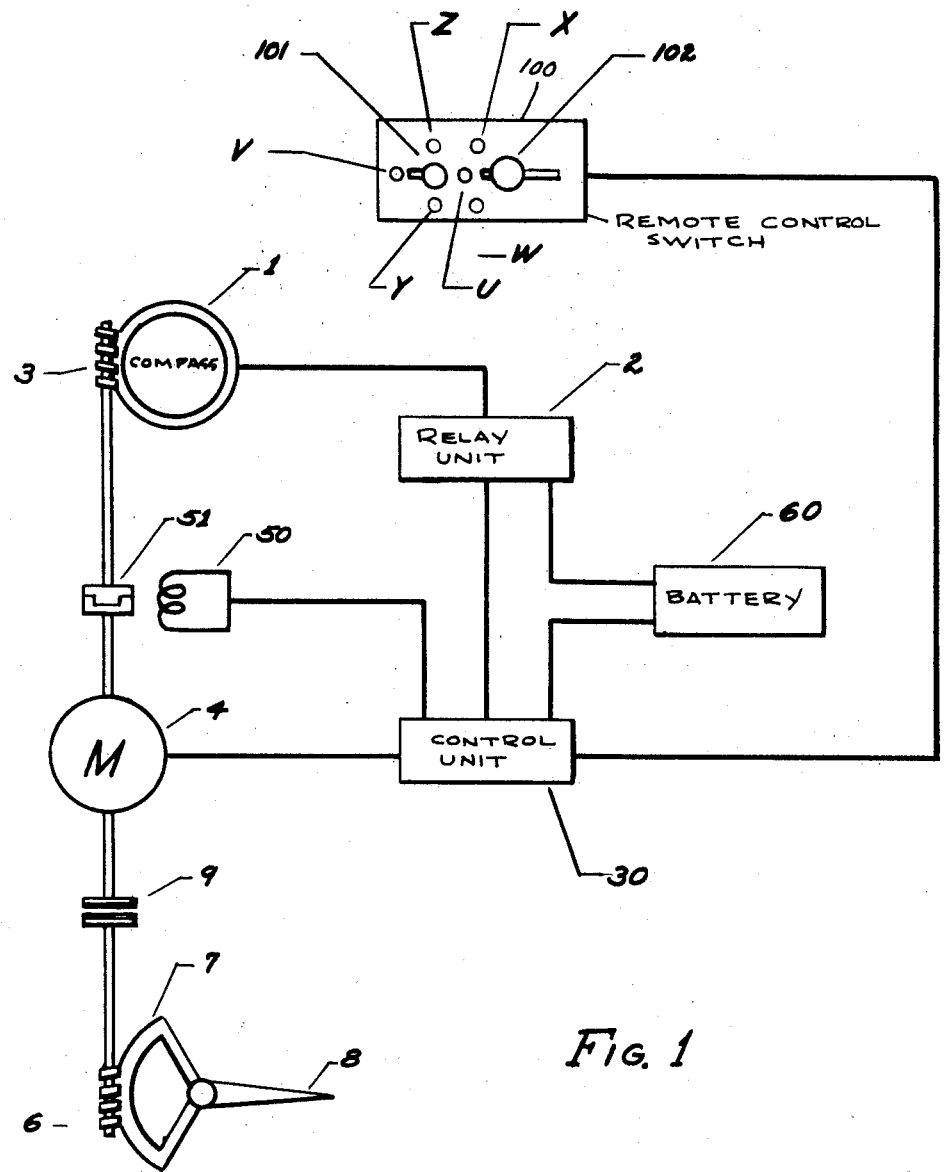

Robert M. Freeman
INVENTOR.

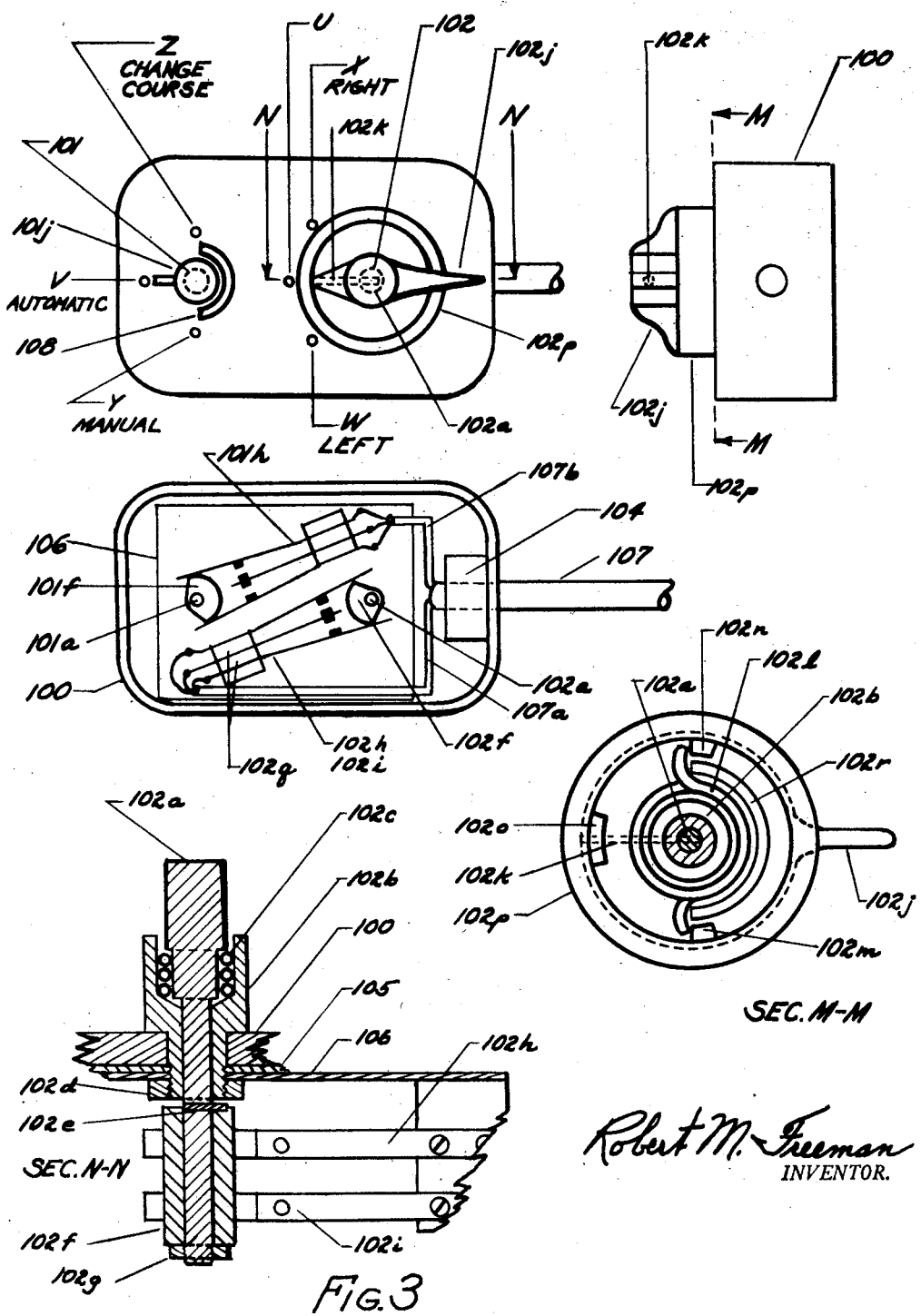

United States Patent Office 2,891,205
Patented June 16, 1959

2,891,205

REMOTE CONTROL FOR AUTOMATIC PILOTS OF MARINE VESSELS OR OTHER MOVING BODIES

Robert M. Freeman, Tacoma, Wash.

Application June 14, 1954, Serial No. 436,553

2 Claims. (Cl. 318—19)

The object of my invention is to provide means whereby temporary or permanent changes of an automatic course, maintained in a marine vessel by an automatic pilot equivalent to that outlined in U.S. Patent 2,089,914, can be temporarily or permanently changed from a remote station which may be portable if desired. The present practice with the referenced device is to change course by declutching the drive between the motor driving the rudder and the rudder itself. The rudder is then moved by hand, by means of the steering wheel, bringing the vessel to the desired new course. The motor, being connected by a drive mechanism to the compass housing, rotates the compass housing to a new angular relationship with the rudder and the new course will be automatically maintained when the clutch between the rudder and its driving motor is re-engaged, since no further change in angular relationship between the rudder and the compass housing can then occur. A disadvantage of this system is that the operator must have access to both the clutch and the steering wheel, either directly or by suitable mechanical linkage. Hence, remote control mechanisms relying on declutching and turning steering wheel by hand are expensive and cumbersome, and generally impractical.

In order to obviate the disadvantages previously noted and to effect a permanent change of course, I have made use of a principle of declutching the follow-up mechanism between the motor driving the rudder and the housing of the control compass which furnishes directional signals to the steering motor. This principle allows the rudder to be turned by the motor which is in turn controlled by switches and relays, while the compass housing remains stationary. Such declutching occurs only during the time that the motor is running. The clutch automatically re-engages whenever the remote control selector switch controlling motor rotation is released by the operator.

The declutching and subsequent reclutching alters the angular relationship between the compass housing and the rudder, resulting in the vessel assuming a new automatic course in the direction in which the turn was made, the degree of alteration being proportional to the angular displacement effected between the compass housing and the rudder.

The invention also incorporates features allowing temporary course changes, both for immediate return to original course when the steering switch is released by the operator, a feature known as "Dodging," and for delayed return to original course, such delay being terminated at the will of the operator by appropriate movement of the selector switch. The latter feature is known as "Course Memory" since the mechanism appears to "Remember" the automatic course it was last on when maneuvering of the vessel by remote control was begun.

Figure 2:
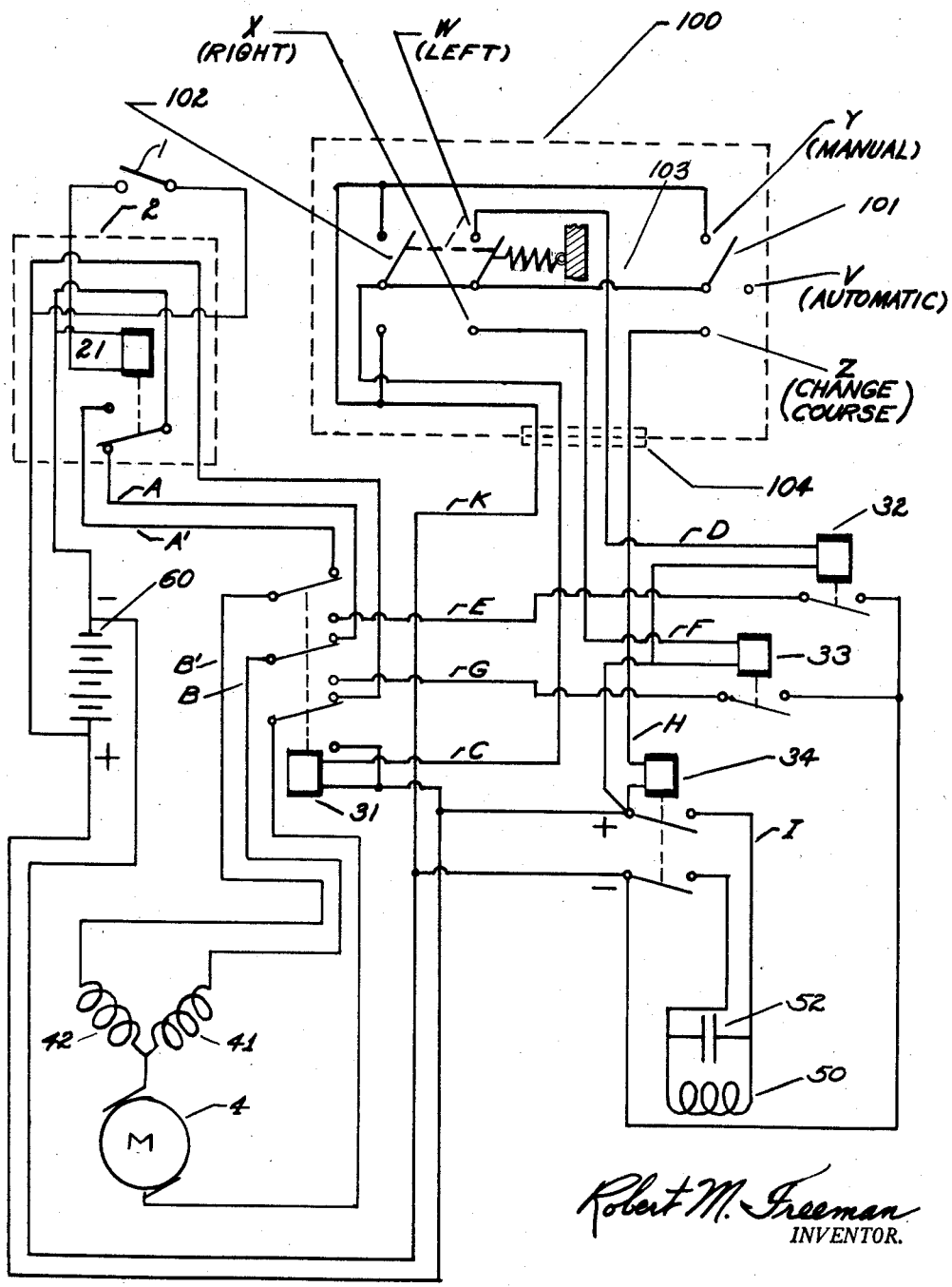

I have attained this result by means of the following described devices in which, referring to the accompanying drawings, Figure 1 shows a block diagram of the entire automatic pilot and remote control mechanism. Figure 2 shows a wiring diagram of the remote control device and Figure 3 shows drawing details of the waterproof remote control switch.

Referring now to Figure 1, the control compass 1 gives suitable signals to relay unit 2 which signals are then amplified and passed to relay unit 30 which in turn transmits these signals unchanged to motor 4. Motor rotation applies corrective action to rudder 8 through friction clutch 9 and the worm 6 and worm sector 7 (or a spur gear equivalent). A mechanical coupling between motor 4 and compass unit 1 through gear 3 provides a followup between the rudder 8 and the compass 1 so that the rudder displacement is proportional to vessel displacement from the previously set automatic course. This system except for control unit 30 is essentially that outlined in U.S. Patent 2,089,914 and others. In order to effect a change of course, it is necessary to disengage mechanical clutch 9, set the vessel on the new course by hand steering, and then re-engage clutch 9. This method of changing course requires the presence of the operator either at the mechnical clutch 9 or requires a mechanical extension between clutch 9 and the operator's station, and requires manual movement of rudder, since the motor 4 is declutched from rudder 8. It can be seen from Figure 1 that declutching clutch 51 in the follow-up system between motor 4 and compass 1 will permit movement of the rudder by motor while the compass remains stationary. This will effect a change in the angular relationship between rudder 8 and compass 1 and thus effect a change in the automatic course when the clutch 51 is re-engaged. For satisfactory course changing it is essential that clutch 51 be disengaged only when steering motor 4 is turning rudder 8 under direction of remote control 100, and that clutch 51 immediately re-engage when control of motor 4 returns to compass 1. This is readily accomplished by the described device. Referring to the Figure 2, the remote control switch 100 consists of a single-pole, double-throw, neutral center selector switch 101 and a spring loaded double-pole, double-throw, neutral center steering switch 102. With these switches in neutral or open positions, relays 32, 33, and 34 are de-energized in the open position. Relay 31 is de-energized allowing steering relay 21 under control of the automatic steering device to energize circuit A or A' which in turn connects to circuit B or B' through the contacts of relay 31 thus energizing motor 4 to run in the proper direction as dictated by position of steering relay 21. When selector switch 101 is in the neutral position V, also known as the automatic position, the steering motor 4 is entirely under the control of steering relay 21 which in turn is controlled by the compass 1 signals essentially as outlined in Patent 2,089,914, the remote control being essentially non-functional. Although the circuit shown utilizes for motor reversing a single-pole, double-throw steering relay 21 and a motor 4 employing separate fields 41 and 42, it is possible to accomplish the same effect using a double-pole, double-throw reversing switch with a conventional four wire circuit for motor reversing.

In order to accomplish "Dodging," momentary changes of course with immediate return to original course, switch 102 is moved either to position W for left rotation, or position X for right rotation of steering motor 4. When switch 102 is placed in position W, the negative side of the battery 60 is connected to the common buss 103 energizing circuits C and D. Circuit C energizes relay 31 which disconnects the steering motor 4 from control of steering relay 21 and gives control of steering motor 4 to relays 32 and 33, through circuits D and F respectively. Relays 32 and 33 may be energized separately but not simultaneously. Circuit D energizes relay 32 which energizes circuit E which in turn energizes steering motor 4 through circuit B' and field 42 inducing rotation in proper direction. When switch 102 is placed in position X the same sequence occurs except that circuit F and relay 33 are energized instead of relay 32, and motor 4 is energized through circuit G and field 41 to provide right rotation. When switch 102 is released and moves to the neutral center position U by spring return, relay 31 and both relays 32 and 33 are de-energized, the contacts of relay 31 returning to the position where control of steering motor 4 is taken over by steering relay 21 to circuits A and A'.

When switch 101 is moved to manual position Y, the negative side of the battery 60 is connected through circuit K to the common buss 103 energizing relay 31 through circuit C. This changes control of the steering motor 4 from steering relay 21 to relays 32 and 33. However, as yet, neither relays 32 or 33 have been energized and, therefore, no current flows to motor 4. Motor 4 therefore stops rotation, holding the rudder 8 in a fixed position by friction of the drive system. However, when switch 102 is placed in either position X or position W, relays 33 or 32 respectively are energized causing motor 4 to rotate in desired direction. When switch 102 is released, its return spring immediately returns the switch to its neutral center, neither relays 32 nor 33 are energized and no current flows to the motor 4, motor rotation ceases, holding the rudder 8, Figure 1, in its present position by friction of the drive system. In maneuvering of the vessel by this method, there is no change in angular relationship between steering motor 4, rudder 8, and compass 1. Therefore, when control of steering motor 4 is returned to steering switch or relay 21, the vessel will again resume the automatic course it was on when maneuvering was commenced. I, therefore, have a feature "Course Memory" since the pilot will "Remember" the last automatic course that the vessel was on prior to commencing maneuvering irrespective of how much time may pass.

When switch 101 is placed in "Change Course" position Z, no energization of relay 34 can take place until switch 102 is moved either to position W or position X. Therefore, control of steering motor remains with steering relay 21 and vessel retains its automatic course. However, when switch 102 is moved to position X, buss 103 is energized thus energizing circuit H and relay 34. This in turn, through circuit I, energizes the solenoid 50 which acts to disengage interdigitating clutch 51. A capacitor 52 is utilized across solenoid coil 50 to prolong relay point life. Synchronized with energizing of relay 34 is energizing of relay 31 shifting control of motor 4 from steering relay 21 to relay 33, and energizing of relay 33 which in turn, energizes through circuit G circuit B and field 41, the steering motor 4 producing rotation to the right. Since energizing of solenoid 50 has declutched the steering motor 4 from the compass housing 1, the rudder 8 is free to turn under direction of motor 4 while compass housing 1 remains stationary. This changes the angular relationship between rudder 8 and compass housing 1. When switch 102 is released and returns to neutral position, relay 34 is de-energized and opens thus de-energizing solenoid 50. Clutch 51 being spring-loaded re-engages immediately. Relay 33 is de-energized, relay 31 is de-energized either simultaneously with or after relay 33 and control of steering motor 4 is returned to steering relay 21. Since a change of angular relationship has occurred between rudder 8 and compass 1 Figure 1, a change of course proportional to the angular displacement will be effected in the direction in which rudder 8 was turned. For example; right rudder will produce a change in course of the vessel to the right. The degree of course change is dependent on the length of time that steering switch 102 is kept in position X. For changing course, in the opposite direction, the same sequence of events occurs except that relay 32 instead of relay 33 is energized when the switch 102 is placed in position W and motor rotation is therefore in the opposite direction. The total amount of course change is limited by available rotation of rudder 8 and it is therefore necessary to assume a steady automatic course briefly after each course change exceeding approximately 45-degrees.

Figure 3 shows essential details of the remote control switch mechanism consisting of a double-pole double-throw, neutral-center, spring-loaded switch 102 and a single-pole double-throw, neutral-center switch 101. Both switches are equipped with suitable stops to maintain alignment at proper stations. A suitable water and corrosion resistant housing 100 which may be either of plastic, metal or other suitable material, houses the entire switch mechanism and is sealed at the junction of the rubber covered conductor cable 107 with waterproof case 100 by means of sealing block 104, and suitable sealing compound or by means of a conventional packing gland. Section N—N shows the method of sealing switch shaft 102a as it passes through case 100. Switch assembly 101 also utilizes the sealing method shown on section N—N. However, switch 101 contains a single-pole double-throw switch rather than a double-pole double-throw switch. Referring now to section N—N, switch shaft 102a passes through switch sleeve 102b and a water-tight seal is produced between these two parts by one or more O-rings 102c. The shoulder of switch shaft 102a rides on the superior surface of the top O-ring, thereby positioning shaft against downward thrust. Upward thrust of the shaft is taken by pin 102e, against the under surface of sleeve 102b. Pin 102e also serves to position cam 102f upon shaft 102a causing the shaft and the cam to rotate as a unit. Nut 102g screws on shaft 102a holding cam 102f firmly against pin 102e. Nut 102d screws onto sleeve 102b holding sleeve 102b firmly against casing 100. When sleeve 102b is accurately machined and casing 100 is of suitable plastic material, a water-tight seal is formed at the junction of sleeve 102b and casing 100 by virtue of pressure exerted against the upper surface of casing 100 by sleeve 102b when nut 102d is tightened. If a metal case 100 is used, a gasket is required at this junction. When casing 100 is transparent plastic, suitable name plate 105 is placed immediately between the plastic cover 100 and immediately beneath the name plate is placed the switch support bracket 106 which carries switches 102h, 102i, and 101h. Switch 101h engages cam 101f while switches 102h and 102i engage cams 102f and these switches are electrically interconnected as shown in Figure 2. Switch 101 is controlled by the operator through knob 101j and is set at position V, Y, or Z as desired by the operator, remaining in position by friction of the O-rings on the shaft. Stop 108 provides a limit to the travel of knob 101j without imposing any torque upon the switch shaft. The mechanism of switch 102 is essentially that shown in section N—N but in addition has the spring-centering device and control knob shown of section M—M. Referring to section M—M, the control knob 102j is fastened by pin or set screw 102 to shaft 102a so that knob 102j and shaft 102a rotate as a unit. Knob 102j is immediately above spring housing 102p which is in turn secured to housing 100. A hemi-cylindrical skirt 102r is attached to knob 102j and projects the full distance between knob 102j and housing 100. Surrounding sleeve 102b is a pre-loaded torque spring 102l with its ends resting on stop 102n and 102m. Since spring housing 102p and its accompanying stops 102n and 102m are fixed with respect to housing 100, any rotation of knob 102j and its accompanying skirt 102r will immediately cause skirt 102r to engage one end of spring 102l and exert torque upon the spring 102l. Such rotational movement can continue until the end of spring 102l engages stop 102o at which time further movement of knob 102j is not possible. Upon release of knob 102j by the operator, the torque of spring 102l will immediately return the displaced end of spring 102l to rest against either stop 102n or 102m depending on which end was displaced, thus returning skirt 102r and knob 102j to the center position. When knob 102j and its accompanying skirt 102r have reached the center position, the end of torque spring 102l now rests against stop 102n and no further torque is transmitted in either direction to skirt 102r. Knob 102j therefore remains held firmly in a neutral center position U until again displaced by the operator. By this device, effective spring centering of switch assembly 102 is accomplished in spite of the inherent friction encountered in the water-tight seal, 102c. Furthermore, since the stop mechanism and the torque spring mechanism act on knob 102j directly, the only torque loads imposed upon shaft 102a are the very small loads caused by friction of the switch mechanism upon the cam. The danger of damage to the delicate internal mechanism by rough handling of the exterior is therefore minimized; a highly desirable feature in this type of equipment.

In accordance with the provisions of the patent statutes I have herein described the principle and operation of my invention together with the apparatus which I now consider to represent the best embodiment thereof, but I desire to have it understood that the apparatus shown is only illustrative and that the invention can be carried out by other means. Also, while it is designed to use the various features and elements in the combination and relation described, some of these may be altered and others omitted without interfering with the more general results outlined and the invention extends to such use.

I claim:

1. The combination in an automatic steering system for a steerable craft having a rudder, a reversible motor means connected to said rudder, means for manually clutching and declutching said motor means to said rudder; directional means, a mechanical feed back means for constantly informing said directional means of movements and position of said rudder, a solenoid clutch means for interrupting said mechanical feedback means; an electrical controlling unit associated with and responsive to said directional means and directing said motor means; manually actuable switch means which upon actuation simultaneously render said unit unresponsive to said directional means, assume direction of said controlling unit, causing rotation of said motor means in direction selected, and cause disengagement of said solenoid clutch; said switch means upon deactuation simultaneously relinquishing direction of said controlling unit to said directional means and causing engagement of said solenoid clutch.

2. The combination as defined in claim 1 in which said directional unit is a magnetic compass.

References Cited in the file of this patent
UNITED STATES PATENTS

| | | |
|---|---|---|
| 1,772,788 | Sperry | Aug. 12, 1930 |
| 2,644,061 | Dietrich | June 30, 1953 |
| 2,753,499 | Dion | July 3, 1956 |